United States Patent [19]

Kelsey

[11] Patent Number: 5,705,575
[45] Date of Patent: Jan. 6, 1998

[54] COPOLYESTER COMPOSITION

[75] Inventor: Donald Ross Kelsey, Fulshear, Tex.

[73] Assignee: Shell Oil Company, Houston, Tex.

[21] Appl. No.: 725,270

[22] Filed: Oct. 2, 1996

Related U.S. Application Data

[63] Continuation of Ser. No. 455,124, May 31, 1995, abandoned.

[51] Int. Cl.$^6$ .................. C08L 67/02; C08G 63/127; C08G 63/137
[52] U.S. Cl. .................. 525/444; 528/283; 528/307
[58] Field of Search .................. 528/307, 283; 525/444

[56] References Cited

U.S. PATENT DOCUMENTS

| | | | |
|---|---|---|---|
| 2,720,507 | 10/1955 | Caldwell | 528/283 |
| 3,249,652 | 5/1966 | Quisenberry | 528/307 |
| 3,360,547 | 12/1967 | Wilson et al. | 260/485 |
| 4,525,504 | 6/1985 | Morris et al. | 524/99 |
| 5,187,216 | 2/1993 | Cassell et al. | 524/261 |
| 5,252,282 | 10/1993 | Po' et al. | |
| 5,256,758 | 10/1993 | Kuo | 528/176 |

FOREIGN PATENT DOCUMENTS

| | | |
|---|---|---|
| 1456345 | 12/1965 | France. |
| 4165308 | 6/1992 | Japan. |
| 1044015 | 9/1966 | United Kingdom. |
| 93/4102 | 3/1993 | WIPO. |

OTHER PUBLICATIONS

Jackson et al., *J. Appl. Poly. Sci.*, 14, 685 (1970).
Jackson et al., *J. Appl. Poly. Sci.*, 12, 1713 (1968).
Jackson et al., *Am. Chem. Soc., Div. Org. Coatings Plast. Chem.*, 26, 170 (1966).

*Primary Examiner*—Patricia A. Short

[57] ABSTRACT

According to the invention, an amorphous copolyester is prepared by contacting, under polymerization conditions an aromatic dicarboxylic acid or ester or anhydride thereof, a 2,2,4,4-tetraalkyl-1,3-cyclobutanediol and 1,3-propanediol or 1,4-butanediol. The resulting copolyester exhibits superior thermal and impact properties.

12 Claims, No Drawings

COPOLYESTER COMPOSITION

This is a continuation of application Ser. No. 08/455,124, filed May 31, 1995, now abandoned.

BACKGROUND OF THE INVENTION

This invention relates to polyester compositions. In one aspect, the invention relates to cyclobutanediol copolyesters having superior impact resistance and transparency.

BRIEF DESCRIPTION OF THE INVENTION

According to the invention, a copolyester is prepared by contacting, under polymerization conditions, an aromatic dicarboxylic acid or ester or anhydride thereof, a 2,2,4,4-tetraalkyl-1,3-cyclobutanediol and 1,3-propanediol or 1,4-butanediol. The resulting amorphous copolyester exhibits superior thermal and impact properties.

DETAILED DESCRIPTION OF THE INVENTION

The invention copolyester is prepared from the following monomers:

(a) one or more aromatic $C_{8-22}$ dicarboxylic acids, including terephthalic acid, isophthalic acid, phthalic acid and 2,6-naphthalene dicarboxylic acid; alkyl diesters thereof such as dimethyl, diethyl and dipropyl diesters; and anhydrides thereof such as phthalic anhydride. Terephthalic species such as dimethyl terephthalate and terephthalic acid are preferred;

(b) one or more 2,2,4,4-tetraalkyl-1,3-cyclobutanediols in which the alkyl groups are independently $C_{1-8}$, preferably methyl or ethyl, most preferably in which each alkyl is methyl and in which the cis/trans cyclobutyl ring isomers based on the relative positions of the hydroxyl groups range from a ratio of about 33:67 to about 67:33; and (c) 1,3-propanediol or 1,4-butanediol or mixtures thereof.

The preferred copolyesters are random copolymers, are amorphous as molded, and have a yellowness index less than about 50. The preferred terephthalate copolyesters can be represented structurally as

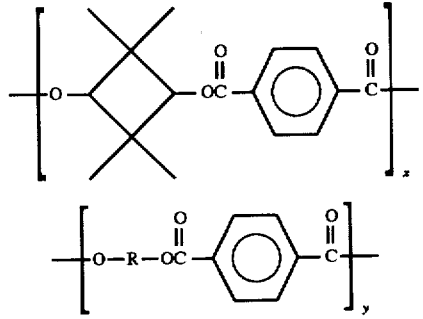

in which R is 1,3-trimethylene groups or 1,4-tetramethylene groups and x:y is within the range of about 40:60 to about 90:10.

The preferred compositions, because of the good combination of thermal and impact properties achieved, are those in which the molar ratio of cyclobutanediol to 1,3-propanediol and/or 1,4-butanediol is about 45:55 to about 85:15. For the desired amorphous copolyesters, the cis:trans isomer ratio is within the range of about 33:67 to about 67:33, preferably about 40:60 to about 60:40; most preferably about 45:55 to about 55:45.

The copolyesters of the invention can be prepared by condensation polymerization which can be carried out by (a) transesterification polycondensation in which the diol is reacted with a dicarboxylate diester in the presence of a catalyst, or (b) dehydrative polycondensation in which the diol is reacted with a dicarboxylic acid, optionally in the presence of a catalyst.

There are many suitable catalysts for the polycondensation reaction, including compounds and salts of alkali and alkaline earth metals such as sodium and calcium, of first row transition metals such as titanium, manganese, cobalt and zinc, and of Group IIA-VA elements such as antimony, tin, lead and germanium, and also including inorganic and organic acid catalysts such as phosphoric acid and toluene sulfonic acid.

The preferred catalysts for preparation of the invention copolyesters are compounds of tin, manganese, zinc, cobalt and titanium. Tin catalysts, alone or in combination with a cocatalyst, are particularly preferred because of the faster reaction rate with the cyclobutanediol and formation of low-color copolymers with 1,3-propanediol or 1,4-butanediol. Examples of tin catalysts include dibutyltin oxide, tin acetate, tin oxalate, dibutyltin dimethoxide, tin isopropoxide, tributyltin acetate, dioctyltin oxide, dimethyltin dichloride, triphenyltin acetate, tin amyloxide, dibutyltin bis(2-ethylhexanoate), dibutyltin dilaurate, tin chloride, potassium tin oxide, tin oxide, bis(tributyltin oxide) and the like.

Transesterification copolycondensation can be carried out by heating excess diols with dicarboxylate diester and catalyst at a temperature sufficient to distill off the alcohol derived from the ester, usually methanol, ethanol or phenol, and then applying sufficient vacuum and heat to distill off the excess diol. In the case of the cyclobutanediol copolyesters of this invention, we have found that temperatures of about 180° to about 250° C. are suitable for the first stage in which about 70% or more of the corresponding alcohol is removed and for the second (vacuum) stage temperatures above about 250° C. are preferred once the vacuum is reduced to below about 1 mm Hg and preferably to below about 0.5 mm Hg. The copolymerization may be carried out batchwise in a conventional reactor or continuously as in an extruder.

It is common to further advance the polymer molecular weight in a separate, additional step referred to as solid state advancement by heating the polymer, often in the form of particles or powder, under vacuum and/or a flow of inert gas. For the amorphous copolymers of the invention, such solid state post-treatment may be used, particularly if the temperature during this treatment does not exceed the glass transition temperature of the copolymer by more than about 20° C. and preferably is kept at or below the copolymer glass transition temperature. If desired, the post-treatment can be carried out in the melt at temperatures at least about 20° C. above the Tg of the copolymer, as in an extruder.

The transesterification copolycondensation (using, for example, the diols and a dicarboxylate diester) can be carried out in various ways, including first reacting the cyclobutanediol and diester with tin catalyst, then adding 1,3-propanediol and/or 1,4-butanediol and an optional catalyst such as titanium butoxide followed by the vacuum step; and reacting cyclobutanediol, 1,3-propanediol and/or 1,4-butanediol and diester with a tin catalyst or a tin/titanium catalyst followed by the vacuum step.

The desired molar ratio of cyclobutanediol to 1,3-propanediol and/or 1,4-butanediol in the polymer can be obtained by adjusting the initial monomer charge. This CBDO/diol molar ratio in the polymer has been found to closely match the CBDO/diol molar ratio charged to the reactor. Excess diol (cyclobutanediol plus 1,3-propanediol and/or 1,4-butanediol) is desirable in the initial stages of the polymerization. The excess of diols to diester is generally within the range of about 5 to about 150% or more, preferably from about 10 to about 100%, most preferably about 20 to about 30% moles per mole diester. Excess diols are removed at the later stages of the process to obtain high molecular weight polymers.

For dehydrative polycondensation, the reaction temperature is generally above 200° C., preferably above 250° C. It is often desirable to conduct at least the initial stages of the reaction under pressure so as to avoid loss of monomers. Generally, an excess of diols of about 2 to about 30 mole % is preferred.

During the polymerization reaction, stabilizers and other additives may be present during the reaction or added to the polymer.

By "amorphous" is meant that the invention copolymers do not exhibit a distinct melting point (by differential scanning calorimetry at 10° C./min.) after being molded under typical molding conditions. Furthermore, the invention copolyesters are soluble at room temperature in chlorohydrocarbon solvents such as methylene chloride and chloroform. By contrast, the homopolyesters of 2,2,4,4-tetramethyl-1,3-cyclobutanediol, 1,3-propanediol and 1,4-butanediol and certain crystalline CBDO/PDO and CBDO/BDO copolymers are generally not soluble to an appreciable degree in these solvents. The amorphous polymers of the invention are generally transparent or slightly opaque glasses, while crystalline or crystallizable polymers are generally noticeably opaque.

A benefit of the cyclobutanediol copolyesters containing 1,3-propanediol or 1,4-butanediol monomers is relatively low color, as compared with ethylene glycol-containing cyclobutanediol copolyesters, which tend to test high on the yellowness index (ASTM D-1925) as measured on ⅛" disks (see Table 2 of Example 3). The invention copolymers preferably exhibit yellowness indexes less than about 50, most preferably less than about 20. The preferred copolyesters have high molecular weights, most preferably reflected in an intrinsic viscosity (IV) (in hexafluoroisopropanol at room temperature) of at least about 0.5 preferably about 0.6 to about 1.0. Preferred copolyesters have notched izod impacts (⅛" thickness) of greater than about 2, most preferably greater than about 3 ft-lb/in, and glass transition temperatures greater than about 80° C., most preferably greater than about 100° C.

The copolyesters of the invention can be used in applications in which clarity, low shrinkage during molding, weatherability and toughness are desired in the preparation of molded articles such as lenses, glazing, packaging and compact disks. The invention copolyesters can also be blended with other polymers such as ABS, polycarbonates, poly(ethylene terephthalate) and poly(trimethylene terephthalate).

EXAMPLE 1

Catalyst Reactivity

A 250-mL three-neck reaction flask fitted with a mechanical stirrer, graduated Dean-Stark trap and water-cooled condenser was charged with dimethyl terephthalate (0.10 moles, 19.4 g), 2,2,4,4-tetramethyl-1,3-cyclobutanediol (0.12 mol, 17.06 g), catalyst (see Table 1) and 0.035 g Irganox® 1098 free radical stabilizer. The mixture was degassed four times with argon and then heated in an oil bath to 240° C. (bath temperature) at atmospheric pressure. The amount of methanol collected in the trap was measured at various times. The theoretical yield of methanol is 8.1 mL. Methanol yield for various catalysts is shown in Table 1.

TABLE 1

| Catalyst | gm | mmol | Time (min.) | Yield (mL) | Time (min.) | Yield (mL) | Time (min.) | Yield (mL) | Time (min.) | Yield (mL) |
|---|---|---|---|---|---|---|---|---|---|---|
| But$_2$SnO | 0.0154 | 0.062 | 15 | 2.0 | 35 | 4.6 | 65 | 5.6 | 255 | 6.4 |
| Co(OAc)$_2$ | 0.0152 | 0.061 | 13 | 1.2 | 33 | 2.9 | 53 | 3.2 | 305 | 5.0 |
| Mn(OAc)$_2$ | 0.0103 | 0.060 | 10 | 1.2 | 38 | 2.1 | 54 | 2.3 | 326 | 3.8 |
| Zn(OAc)$_2$ | 0.0135 | 0.062 | 15 | 0.1 | 30 | 0.9 | 70 | 1.8 | 205 | 2.8 |
| NaOAc | 0.0052 | 0.063 | 20 | ND | 40 | ND | 60 | SL | 300 | 0.3 |
| Ti(OBut)$_4$ | 0.0206 | 0.061 | 15 | ND | NM | NM | 60 | ND | 270 | 0.2 |
| (EtO)$_4$Ge | 0.0154 | 0.061 | 10 | ND | 20 | ND | 60 | ND | 235 | SL |
| Sb$_2$O$_3$ | 0.0089 | 0.031 | 20 | SL | 50 | SL | 100 | SL | 255 | SL |

SL = slight distillate formed
ND = not detected
NM = not measured

The results show the tin catalyst to be the most active for polymerizations using cyclobutanediol monomer. Cobalt, manganese and zinc catalyst are somewhat less reactive. However, catalysts with low activity toward cyclobutanediol such as titanium tetrabutoxide can be used in combination with the more active catalysts.

EXAMPLE 2

Copolyesters with Ethylene Glycol

To the reaction described above with cobalt acetate catalyst was added ethylene glycol (1.86 g, 0.03 mol), and the reaction was heated in the 240° C. bath at atmospheric pressure. After three hours, an additional 2.6 mL of methanol had distilled. The reaction was then heated at 260° C. under vacuum. After about 5 hours, some thickening was noted but the mixture was a stirrable liquid, indicating a relatively low molecular weight product. Titanium tetrabutoxide (0.0069 g) was added and no appreciable increase in viscosity was apparent after three hours. The final polymer had a bluish cast and IV of 0.18.

Similarly, to the reaction above with zinc acetate catalyst was added ethylene glycol (1.86 g, 0.03 mol). After four hours at 240° C., an additional 2.5 mL of methanol was collected. Subsequent heating under vacuum at 260° C. for a total of about 12 hours gave a yellow polymer having IV 0.22.

Similarly, to the reaction above with manganese acetate catalyst was added ethylene glycol (1.86 g, 0.03 mol); after four hours at 240° C. an additional 2.9 mL methanol was collected and the reaction mixture had turned brownish yellow. Subsequent heating under vacuum at 260° C. for about 4 hours gave a dark amber polymer with IV 0.13.

The results show the poor quality, in terms of color and molecular weight, of the copolymers prepared with ethylene glycol comonomer. The tin catalyst was better in terms of the final copolymer molecular weight but produced very yellow copolymer (see Table 2).

EXAMPLE 3

Preparation of Copolyesters

A 1-L, three-neck reaction flask fitted with a mechanical stirrer and distillation head was charged with dimethyl terephthalate (DMT:155.36 g, 0.80 mol, 99%), 2,2,4,4-tetramethyl-1,3-cyclobutanediol (CBDO:91.01 g, 0.64 mol, cis:trans about 48:52), Irganox® 1098 stabilizer (0.2555 g) and dibutyltin oxide (0.127 g, 0.485 mmol), degassed with argon and heated in an oil bath at about 235°–250° C. for about 5.5 hours to distill out methanol (about 35 g) and then the reaction was cooled to room temperature. 1,3-Propanediol (P:27.43 g, 0.36 mol, distilled) and titanium tetrabutoxide (0.535 g, 0.154 mmol, 99%) were added to the reaction mixture, the flask and contents were degassed with argon, and the contents were heated at about 230°–250° C. for about 6 hours to distill out methanol (about 13.9 g). The reaction mixture was cooled to room temperature. The distillation head was replaced by a short path vacuum distillation adaptor with a collection flask cooled in dry ice. The reaction mixture was heated in the oil bath to about 260° C. The pressure was gradually reduced to less than about 1 mm Hg over about 15 minutes and the reaction mixture was then heated under full vacuum for about 7 hours to give a viscous transparent polymer. The polymer was recovered by cutting it into pieces, dissolving it in methylene chloride, filtering, coagulating into methanol (containing a small amount of 2,6-di-t-butyl-4-methylphenol stabilizer) in a blender, washing the polymer twice with methanol and drying in a vacuum oven with $N_2$ bleed. The intrinsic viscosity of the polymer (in hexafluoroisopropanol solution) was 0.78. Nuclear magnetic resonance analysis showed that the final polymer contained CBDO/PDO units in a molar ratio of 64:36, which is essentially the same molar ratio as for the monomers charged to the reactor.

Additional invention polymerizations and comparative polymerizations are shown in Table 2. Runs 4, 6–8, 10–13, 15 and 18 exhibited high impact resistance as expressed in notched Izod values.

TABLE 2

| Run | DMT[a] (mol) | CBDO[a] (mol) | diol[a] (mol) | CBDO/diol Ratio[c] | Method[f] | IV[g] | $T_g$[h] (°C.) | $T_m$[h] (°C.) | Notched Izod[i] | Yellowness Index[j] |
|---|---|---|---|---|---|---|---|---|---|---|
| ~48/52 cis/trans[m] | | | | | | | | | | |
| 1 | 0.80 | 1.04 | | [100/0] | A2 | 0.31 | 174 | >310 | | |
| 2 | 0.50I[b] | 0.56 | 0.06B | 91/9 | A1 | 0.50 | 147 | A | | 14.7 |
| 3 | 0.80 | 0.80 | 0.12P | 87/13 | A2 | 0.57 | 168 | A | 1.9 | |
| 4 | 0.80 | 0.80 | 0.21P | 81/19 | A1 | 0.67 | 154 | A | 5.6 | |
| 5 | 0.80 | 0.72 | 0.28E | 78/22 | A2 | 0.52 | 155 | A | 0.9 | 83.6 |
| 6 | 1.30 | 1.27 | 0.35B | 78/22 | A2 | 0.73 | 145 | A | 9.2 | |
| 7 | 0.80 | 0.72 | 0.28P | 72/28 | A2 | 0.65 | 136 | A | 4.4 | |
| 8 | 0.80 | 0.72 | 0.28B | 72/28 | A2 | 0.61 | 129 | A | 7.1 | 18.9 |
| 9 | 0.20 | 0.15 | 0.10E | 69/31 | B1 | 0.70 | 146 | A | | 79.8 |
| 10 | 0.80 | 0.64 | 0.48E | 68/32 | A1 | 0.52 | 142 | A | 2.1 | 86.9 |
| 11 | 0.80 | 0.64 | 0.36P | 65/35 | A1 | 0.83 | 122 | A | 13.5 | 15.7 |
| 12 | 0.80 | 0.64 | 0.36P | 64/36 | A2 | 0.78 | 121 | A | 11.7 | |
| 13 | 0.80 | 0.64 | 0.36B | 64/36 | A2 | 0.73 | 119 | A | 14.1 | 36.9 |
| 14 | 0.30N[c] | 0.24 | 0.14P | 64/36 | A1 | 0.66 | 165 | A | 0.9 | |
| 15 | 0.80 | 0.56 | 0.44P | 57/43 | B1 | 0.73 | 112 | A | 14.2 | 15.9 |
| 16 | 0.20 | 0.15 | 0.15P | [50/50] | A2 | 0.53 | 98 | A | | |
| 17 | 0.20 | 0.10 | 0.13P | [44/56] | B2 | 0.52 | 80 | A | | |
| 18 | 0.80 | 0.40 | 0.60P | 40/60 | B1 | 0.72 | 87 | A | 20 | |
| 19 | 0.80 | 0.25 | 0.75P | [25/75] | B1 | 0.92[k] | 17 | 162 | | |
| 20 | 0.57N[d] | 0.125 | 0.59P | [17/83] | B1 | 0.82[k] | 64 | A | | |
| 21 | 0.80 | | 1.04P | [0/100] | A1 | 1.11[k] | 59 | 235 | 1.0 | |

TABLE 2-continued

| Run | DMT[a] (mol) | CBDO[a] (mol) | diol[a] (mol) | CBDO/ diol Ratio[c] | Method[f] | IV[g] | $T_g$[h] (°C.) | $T_m$[h] (°C.) | Notched Izod[i] | Yellowness Index[j] |
|---|---|---|---|---|---|---|---|---|---|---|
| ~39/61 cis/trans[m] | | | | | | | | | | |
| 22a | 0.35 | 0.341 | 0.097P | 82/18 | B2 | 0.82[k] | 150 | A | | |
| 22b | | | | 81/19 | | 0.70[n] | 138 | A | | |
| 23 | 0.35 | 0.284 | 0.153P | 65/35 | B2 | 0.84 | 119 | A | | |
| ~59/41 cis/trans[m] | | | | | | | | | | |
| 24 | 0.03 | 0.0188 | 0.0188P | 53/47 | B2 | 0.86 | 101 | A | | |

[a]Moles charged. DMT = dimethyl terephthalate; CBDO = 2,2,4,4-tetramethyl-1,3-cyclobutanediol; P = 1,3-propanediol; B = 1,4-butanediol; E= ethylene glycol.
[b]0.375 mole DMT and 0.125 mole dimethyl isophthalate.
[c]0.30 mole dimethyl-2,6-naphthalenedicarboxylate (N).
[d]0.47 mole DMT and 0.10 mole N.
[e]Determined by NMR on isolated polymer. Values in brackets calculated based on reactor charge.
[f]A1 = Dibutyltin oxide and titanium tetrabutoxide catalysts. All reagents charged initially to reactor and methanol distilled at atmospheric pressure. Reaction product then heated under vacuum. A2 = Dibutyltin oxide catalyst with CBDO and DMT charged initially to reactor and methanol distilled at atmospheric pressure. Diol and titanium tetrabutoxide catalyst added to reactor and methanol distillation resumed. Reaction product then heated under vacuum. B1 = Method A1 using only dibutyltin oxide catalyst. B2 = Method A2 using only dibutyltin oxide catalyst.
[g]Intrinsic viscosity in hexafluoroisopropanol at room temperature.
[h]By differential scanning calorimetry. Values shown are those obtained on the second heating of the sample. "A" indicates the copolymer was amorphous as molded and/or the second heating in the DSC showed essentially no melting transitions.
[i]Ft-lb/in. measured on compression-molded samples of about 125 mil thickness.
[j]ASTM D-1925.
[k]Polymer was insoluble or only partially soluble in methylene chloride.
[m]Based on GC analysis of starting monomers.
[n]Fraction soluble in methylene chloride.

EXAMPLE 4

1,4-Butanediol Copolyester

Copolymer was prepared essentially as described in Example 3 using CBDO and 1,4-butanediol (BDO) in a monomer ratio of 78/22 to produce polymer with a 78/22 CBDO/BDO mol ratio, about 49/51 cis/trans and an IV of about 0.7. The dried polymer (about 370 g) was injection molded (temperature 250°–272° C., 1000 psi injection pressure, 400 rpm, 50° C. mold temperature) to provide transparent, slightly yellow test bars for physical property measurements. Physical properties are shown in Table 3.

EXAMPLE 5

Copolymer was prepared essentially as described in Example 3 in several batches using an initial charge of diols such that the CBDO (about 47:53 cis:trans) to 1,3-propanediol mole ratio was about 77:23 and with about 1.25 mole diols per mole dimethyl terephthalate. Dibutyltin oxide catalyst was used.

The polymers were recovered by coagulation of methylene chloride solutions into methanol to give 1.4 kg polymer fluff. Intrinsic viscosities of the batches ranged from 0.55 to 1.11 and were blended. The prime fraction (0.6 kg) had an IV of 0.96 and yellowness index of 18. Most of the prime material was converted to chips from ⅛" compression molded plaques.

The dried copolymer fluff and chips were injection molded (barrel temperatures 300°–330° C. and mold temperature 80° C. for chips) to produce transparent test samples. Physical properties are given in Table 3.

TABLE 3

| | ASTM | | Ex. 4 | Ex. 5 | Ex. 5 |
|---|---|---|---|---|---|
| Polymer form | | | fluff | fluff | chip |
| CBDO/diol[a] | | (mol/mol) | 78/22 | 78/22 | 78/22 |
| cis/trans[a] | | | 49/51 | 49/51 | 49/51 |
| IV (before)[b] | | | 0.7 | 0.90 | 0.96 |
| IV (after molding)[b] | | | 0.55 | 0.53 | 0.76 |
| Tensile modulus | D-638 | (psi) | 267,000 | | 265,000 |
| Tensile strength | D-638 | (psi) | 4,500 | | 6,600 |
| Elongation | D-638 | (%) | 2 | | 18 |
| Flexural modulus | D-790 | (psi) | | | 263,000 |
| Heat Distortion | | | | | |
| @ 264 psi | D-648 | (°C.) | 105 | 111 | 114 |
| @ 66 psi | D-648 | (°C.) | | 127 | |
| Tg | | (°C.) | 145 | | 150 |
| Notched Izod impact | D-256 | (ft-lb/in) | 9.2 ± 1.0[c] | | |
| @ 23° C. | ⅛" | (ft-lb/in) | 5.3 ± 0.7[d] | | 7.3 ± 0.8[d] |
| @ 23° C. | ¼" | (ft-lb/in) | | | 4.0 ± 1.0[c,e] |
| @ –30°C. | ⅛" | (ft-lb/in) | | | 2.4 ± 0.8[d] |

[a]Based on NMR of copolymer; estimated error in cis/trans is ±2 units and about ±1 unit for DBDO/diol.
[b]IVs in hexafluoroisopropanol.
[c]Compression molded sample.
[d]Injection molded bars.
[e]IV = 0.81 after molding.

EXAMPLE 6

Weathering Comparisons

The CBDO copolyester of Example 5 having a CBDO:PDO mole ratio of 78:22 was injection molded in ⅛ inch thick bars and disks. Disks were used to measure haze, gloss and transmission. Yellowness index (ASTM D-1925) was measured on two compression-molded disks of the same composition. Comparisons were made with unstabilized commercial-grade bisphenol-A-based polycarbonate molded on the same injection molding machine in accordance with the recommended molding conditions.

Sample panels were placed in an accelerated weathering tester and exposed to UVA-340 lamps at the ambient temperature (−50° C.). Panels were rotated twice a week, and lamp positions were changed every 400 hours. Data on optical and impact properties were obtained at intervals over the 2500-hour trial. Results are summarized in Table 4. In comparison with the unstabilized polycarbonate, the unstabilized copolyester exhibited less yellowing upon exposure to ultraviolet light and better retention of notched Izod impact resistance.

TABLE 4

| | Initial | Final | Change | |
|---|---|---|---|---|
| Yellowness index[a] ASTM D-1925 | | | | |
| CBDO copolymer | 17 | 67 | +50 | +294% |
| Polycarbonate | 3 | 87 | +84 | +2800% |
| Haze[a] (%) ASTM D-1003 | | | | |
| CBDO copolymer | 19 | 29 | +10 | +53% |
| Polycarbonate | 3 | 17 | +14 | +470% |
| Transmission[a] (%) ASTM D-1003 | | | | |
| CBDO copolymer | 70 | 63 | −7 | −10% |
| Polycarbonate | 87 | 72 | −15 | −17% |
| Gloss[a] 450 ASTM D-523 | | | | |
| CBDO copolymer | 68 | 62 | −6 | −9% |
| Polycarbonate | 93 | 63 | −30 | −32% |
| Gloss[a] 60° ASTM D-523 | | | | |
| CBDO copolymer | 108 | 72 | −36 | −33% |
| Polycarbonate | 150 | 102 | −48 | −32% |
| Notched Izod impact (ft-lb/in) | | | | |
| CBDO copolymer | 7.3 | 2.1 | −5.2 | −71% |
| Polycarbonate | 18.5 | 1.3 | −17.2 | −93% |
| Dynatup plate impact[b] (ft-lb; total energy) | | | | |
| CBPO copolymer | 7.7[c] | 3.6 | −4.1 | −53% |
| Polycarbonate | 59.2 | 9.9 | −49.3 | −83% |

[a]Optical values are averages of two samples.
[b]Weathering time 2000 hrs.
[c]500 hr sample taken as initial value; unexposed sample showed lower impact.

I claim:

1. An amorphous polymeric composition having an intrinsic viscosity of at least about 0.5 a notched Izod greater than 3 ft-lb/in and a glass transition temperature greater than 100° C. which composition is the product of contacting monomers comprising (a) at least one aromatic dicarboxylic acid or an alkyl ester or anhydride thereof; (b) about 40 to about 90 mole percent based on moles of components (b) and (c) of at least one 2,2,4,4-tetraalkyl-1,3-cyclobutanediol having a cis:trans ratio within the range of about 33:67 to about 67:33; and (c) at least one of 1,3-propanediol and 1,4-butanediol, under polycondensation reaction conditions in the presence of a polycondensation reaction conditions in the presence of a polycondensation catalyst.

2. The composition of claim 1 in which component (a) is selected from the group consisting of terephthalic acid, isophthalic acid, phthalic acid, 2,6-naphthalene dicarboxylic acid, dimethyl terephthalate, diethyl terephthalate, dipropyl terephthalate, dimethyl isophthalate, diethyl isophthalate, dipropyl isophthalate, dimethyl phthalate, diethyl phthalate, dipropyl phthalate, phthalic anhydride, dimethyl 2,6-naphthalene dicarboxylate and diethyl 2,6-naphthalene dicarboxylate.

3. The composition of claim 1 in which the 2,2,4,4-tetraalkyl-1,3-cyclobutanediol is 2,2,4,4-tetramethyl-1,3-cyclobutanediol.

4. The composition of claim 3 in which the molar ratio of component (b) to component (c) is within the range of about 45:55 to about 85:15.

5. The composition of claim 1 in which the polycondensation catalyst is a tin compound.

6. The composition of claim 1 having a yellowness index value (ASTM D-1925) less than about 50.

7. The composition of claim 1 having a yellowness index (ASTM D-1925) less than about 20.

8. The composition of claim 1 in which component (a) is dimethyl terephthalate, component (b) is 2,2,4,4-tetramethyl-1,3-cyclobutanediol, and component (c) is 1,3-propanediol.

9. The composition of claim 1 in which component (b) has a cis:trans isomer ratio within the range of about 40:60 to about 60:40.

10. The composition of claim 1 having an intrinsic viscosity (in hexafluoroisopropanol at room temperature) within the range of about 0.6 to about 1.0.

11. A blend of the amorphous polyester of claim 1 and at least one of poly(ethylene terephthalate) and poly (trimethylene terephthalate).

12. An amorphous copolyester composition having randomly-distributed units of the structural formulas

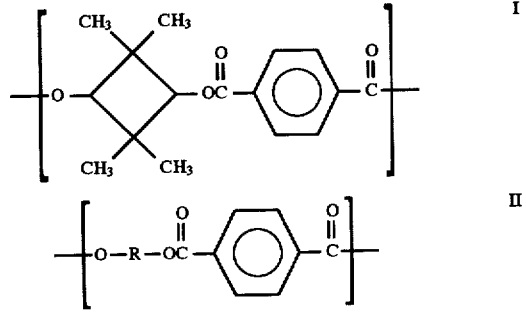

in which the ratio of the number of units of I to the number of units of II is within the range of about 40:60 to about 90:10 and R is 1,3-trimethylene or 1,4-tetramethylene, said composition having a notched Izod greater than 3 ft-lb/in and a glass transition temperature greater than 100° C.

* * * * *